(12) United States Patent
Giulietti et al.

(10) Patent No.: US 10,703,489 B2
(45) Date of Patent: Jul. 7, 2020

(54) MOISTURE EXTRACTION COMPONENT

(71) Applicant: Hamilton Sundstrand Corporation, Charlotte, NC (US)

(72) Inventors: Diana Giulietti, Manchester, CT (US); Steven Poteet, Hamden, CT (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 90 days.

(21) Appl. No.: 16/023,100

(22) Filed: Jun. 29, 2018

(65) Prior Publication Data
US 2020/0002008 A1 Jan. 2, 2020

(51) Int. Cl.
*B64D 13/06* (2006.01)
*B29C 64/165* (2017.01)
*B01D 53/04* (2006.01)
*B01D 53/26* (2006.01)
*B33Y 10/00* (2015.01)
(Continued)

(52) U.S. Cl.
CPC .......... *B64D 13/06* (2013.01); *B01D 53/0431* (2013.01); *B01D 53/261* (2013.01); *B29C 64/165* (2017.08); *B01D 2253/104* (2013.01); *B01D 2253/106* (2013.01); *B01D 2253/1124* (2013.01); *B01D 2257/80* (2013.01); *B33Y 10/00* (2014.12); *B33Y 80/00* (2014.12); *B64D 2013/0618* (2013.01); *B64D 2013/0662* (2013.01); *F24F 2003/144* (2013.01)

(58) Field of Classification Search
CPC ............ B64D 13/06; B64D 2013/0618; B64D 2013/0662; B29C 64/165; B01D 53/36; B01D 53/326; B01D 53/265; B01D 53/0431; B01D 2253/1124; B01D 2253/106; B01D 2253/104; B01D 2257/80; F24F 2003/144; B33Y 80/00; B33Y 10/00; A62C 3/08
See application file for complete search history.

(56) References Cited

U.S. PATENT DOCUMENTS 6,960,243 B1 * 11/2005 Smith .................. B01D 5/0054
95/117
2004/0109981 A1 * 6/2004 Lawrence .............. B01D 1/305
428/141
(Continued)

FOREIGN PATENT DOCUMENTS

CN 102814104 A * 12/2012
DE 19748295 A1 5/1999
(Continued)

OTHER PUBLICATIONS

S. C. Pillai, et al.,"Sol-Gel Materials for Energy, Environment and Electronic Applications", Springer International Publishing, 2017, p. 1-17.
(Continued)

*Primary Examiner* — Emmanuel E Duke
(74) *Attorney, Agent, or Firm* — Cantor Colburn LLP

(57) ABSTRACT

A moisture extraction component including: an inlet; an outlet opposite the inlet; an inner surface defining a main flow channel, the main flow channel fluidly connecting the inlet to the outlet; a path on the inner surface configured to direct moisture flow, the path being defined by differences in hydrophobicity on the inner surface using at least one of a hydrophobic surface and a hydrophilic surface.

20 Claims, 3 Drawing Sheets

(51) Int. Cl.
*B33Y 80/00* (2015.01)
*F24F 3/14* (2006.01)

(56) References Cited

U.S. PATENT DOCUMENTS

2013/0251942 A1* 9/2013 Azimi .................... C04B 35/50
                                                              428/141
2015/0111063 A1  4/2015 Khan et al.
2018/0133634 A1* 5/2018 Zager .................... B01D 45/16

FOREIGN PATENT DOCUMENTS

DE   102008032431 A1   1/2010
JP      2007333222 A  12/2007
WO     2017013351 A1   1/2017

OTHER PUBLICATIONS

The Extended European Search Report for Application No. 19182516. 5-1104; Report dated Nov. 8, 2019; Report; 11 pages.

* cited by examiner

MOISTURE EXTRACTION COMPONENT

BACKGROUND

The subject matter disclosed herein generally relates to the field of air conditioning components, and more particularly to method and apparatus for manufacturing an air conditioning component for an aircraft.

In an aircraft air condition systems, moisture may condense and build up on air conditioning components. The moisture must be collected and drained from engine bleed air, or compressed ambient air, at a location downstream of a condenser to prevent re-entry into the cabin or air cycle machine where the moisture may cause damage.

BRIEF SUMMARY

According to one embodiment, a moisture extraction component is provided. The moisture extraction component including: an inlet; an outlet opposite the inlet; an inner surface defining a main flow channel, the main flow channel fluidly connecting the inlet to the outlet; a path on the inner surface configured to direct moisture flow, the path being defined by differences in hydrophobicity on the inner surface using at least one of a hydrophobic surface and a hydrophilic surface.

In addition to one or more of the features described above, or as an alternative, further embodiments may include that the path is formed by the hydrophilic surface on the inner surface.

In addition to one or more of the features described above, or as an alternative, further embodiments may include that the path is formed by a bare inner surface surrounded by the hydrophobic surface on the inner surface.

In addition to one or more of the features described above, or as an alternative, further embodiments may include that the path is surrounded by the hydrophobic surface on the inner surface.

In addition to one or more of the features described above, or as an alternative, further embodiments may include: an exit port fluidly connecting the inner surface and the outer surface, wherein the path is configured to direct moisture flow along the path to the exit port.

In addition to one or more of the features described above, or as an alternative, further embodiments may include that the hydrophobic surface is composed of at least one of rare earth oxides and phosphates.

In addition to one or more of the features described above, or as an alternative, further embodiments may include that the hydrophilic surface is composed of an inorganic oxide.

In addition to one or more of the features described above, or as an alternative, further embodiments may include that the hydrophilic surface is composed of at least one of silica flour, alumina, and titanium dioxide.

According to another embodiment, an air conditioning system for an aircraft is provided. The air conditioning system including: a condenser; an air cycle machine; a moisture extraction component comprising: an inlet; an outlet opposite the inlet; an inner surface defining a main flow channel, the main flow channel fluidly connect the inlet to the outlet; a path on the inner surface configured to direct moisture flow, the path being defined by differences in hydrophobicity on the inner surface using at least one of a hydrophobic surface and a hydrophilic surface.

In addition to one or more of the features described above, or as an alternative, further embodiments may include that the path is formed by the hydrophilic surface on the inner surface.

In addition to one or more of the features described above, or as an alternative, further embodiments may include that the path is formed by a bare inner surface surrounded by the hydrophobic surface on the inner surface.

In addition to one or more of the features described above, or as an alternative, further embodiments may include that the path is surrounded by the hydrophobic surface on the inner surface.

In addition to one or more of the features described above, or as an alternative, further embodiments may include: an exit port fluidly connecting the inner surface and the outer surface, wherein the path is configured to direct moisture flow along the path to the exit port.

In addition to one or more of the features described above, or as an alternative, further embodiments may include that the hydrophobic surface is composed of at least one of rare earth oxides and phosphates.

According to another embodiment, a method of manufacturing the moisture extraction component is provided. The method including applying two or more binders to a base material powder to build the moisture extraction component one layer at a time to form a plurality of layers, wherein the two or more binders includes a base binder and at least one of a hydrophobic binder to form the hydrophobic surface and a hydrophilic binder to form the hydrophilic surface; and thermally processing the moisture extraction component after the plurality of layers are formed.

In addition to one or more of the features described above, or as an alternative, further embodiments may include that thermally processing includes at least one of sintering and infiltration.

In addition to one or more of the features described above, or as an alternative, further embodiments may include that at least one layer of the plurality of layers includes the base binder and the hydrophilic binder.

In addition to one or more of the features described above, or as an alternative, further embodiments may include that at least one layer of the plurality of layers includes the base binder and the hydrophobic binder.

In addition to one or more of the features described above, or as an alternative, further embodiments may include that at least one layer of the plurality of layers includes the hydrophilic binder and the hydrophobic binder.

In addition to one or more of the features described above, or as an alternative, further embodiments may include that at least one layer of the plurality of layers includes the base binder, the hydrophilic binder, and the hydrophobic binder.

Technical effects of embodiments of the present disclosure include using at least one of a hydrophobic surface and a hydrophilic surface to direct moisture out of an air conditioning system of an aircraft.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

DETAILED DESCRIPTION

A detailed description of one or more embodiments of the disclosed apparatus and method are presented herein by way of exemplification and not limitation with reference to the Figures.

Figure 1:
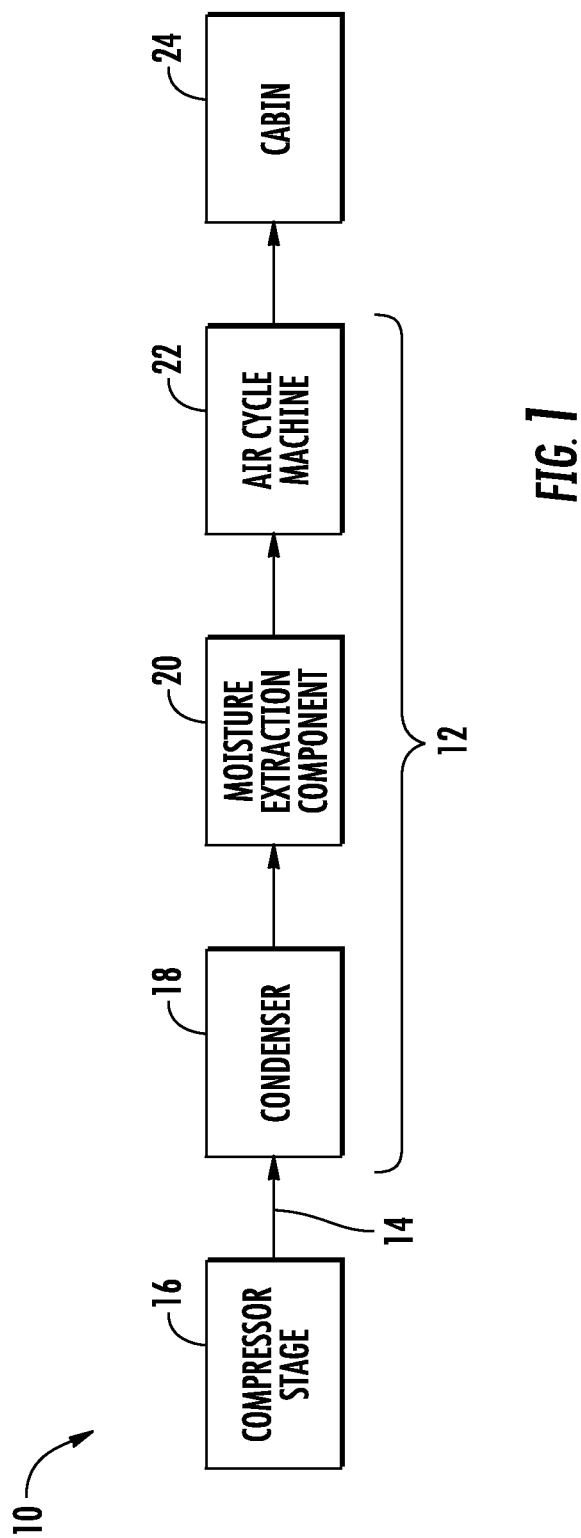
FIG. 1 is a schematic representation of airflow progression through an air conditioning system, according to an embodiment of the present disclosure.

FIG. 1 is a schematic representation of airflow progression 10 through an air conditioning system 12 of an aircraft. It is understood that the air conditioning system 10 is utilized for exemplary purposes and the embodiments disclosed herein may be applied to other systems other than an air conditioning system 12 of an aircraft. The airflow progression 10 is a representation of bleed air 14 as it passes from a compressor stage 16, to an air conditioning system 12 (which includes condenser 18, moisture extraction component 20, and air cycle machine 22), and onto a cabin 24. FIG. 1 is a simplified schematic representation of the system, highlighting the moisture extraction portion. All elements up stream of the condenser 18 and downstream of the moisture extraction component 20 are not depicted. It should be appreciated that, although particular systems in FIG. 1 are separately defined in the schematic block diagrams, each or any of the systems may be otherwise combined or separated via hardware and/or software. For example, the moisture extraction component 20 may be a part of at least one of the compressor stage 16, the condenser 18, the air cycler machine 22, and the cabin 24.

The air conditioning system 12, is a sub-system of an aircraft engine that conditions bleed air 14 so that bleed air 14 can be re-used to perform an additional function within the aircraft. The bleed air 14 is taken from a compressor stage 16 of the aircraft engine. In another non-limiting embodiment, the bleed air 14 can be compressed air taken from an ambient environment. The compressor stage 16 is an intermediate or high pressure stage within the aircraft engine. The condenser 18 is a heat exchanger for condensing moisture into droplets. The moisture extraction component 20 is an elongated tube of solid material with hydrophobic and/or hydrophilic surfaces for extracting moisture from bleed air 14. The air cycle machine 22 is a component of the air conditioning system 12 for controlling the temperature and pressure of bleed air 14 exiting from the air cycle machine 22 and into cabin 24. The cabin 24 is a compartment of the aircraft for housing passengers and equipment.

The compressor stage 16 is fluidly connected to the condenser 18 via fluid lines or conduits in the aircraft. The condenser is fluidly connected to the moisture extraction component 20. The moisture extraction component 20 is fluidly connected to the air cycle machine 22, and the air cycle machine 22 is fluidly connected to the cabin 24.

During operation of the aircraft engine, bleed air 14 is drawn from the compressor stage 16 and into the condenser 18 of the air conditioning system 12. The condenser 18 condenses moisture in the bleed air 14 from vapor into moisture droplets. In some non-limiting embodiments, bleed air 14 can be conditioned by a heat exchanger in order to increase or decrease the temperature of the bleed air 14 exiting from the condenser 18. The bleed air 14, with the condensed moisture droplets, is then transported to the air cycle machine 22. The air cycle machine 22 further conditions the bleed air 14 by altering the temperature and the pressure of the bleed air 14 to a level appropriate from the passengers in the cabin 24. A more detailed example of an aircraft air conditioning system and/or an environment control system can be found in U.S. Pat. No. 8,347,647B2.

Figure 2:
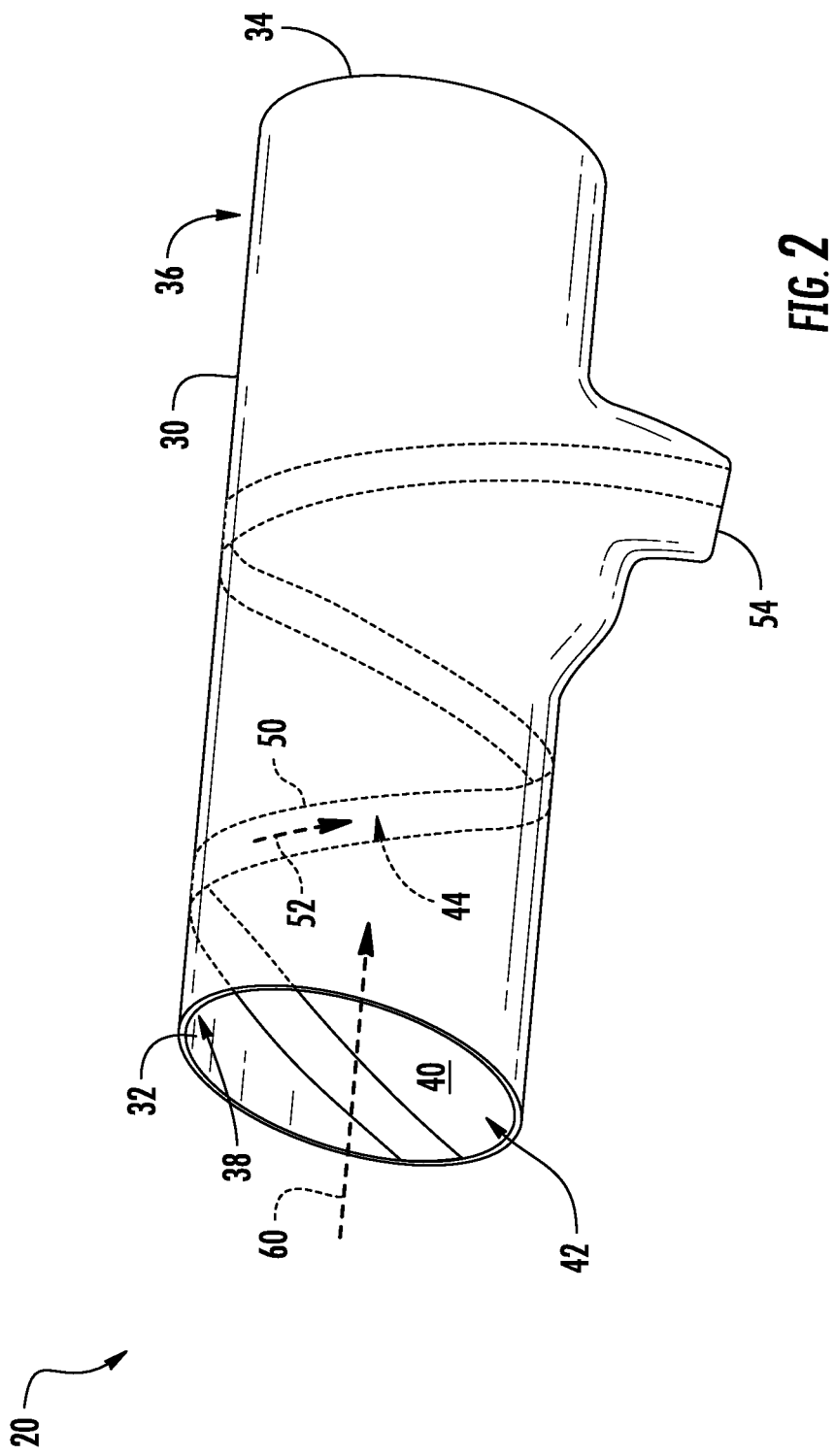
FIG. 2 is a cross-sectional view of a moisture extraction component of the air conditioning system of FIG. 1, according to an embodiment of the present disclosure.

FIG. 2 is a cross-sectional view of moisture extraction component 20, according to an embodiment of the present disclosure. The moisture extraction component 20 includes a body 30, an inlet 32, an outlet 34, an outer surface 36, an inner surface 38, a main flow channel 40, and an exit port 54 fluidly connecting the inner surface 38 and the outer surface 36. The inner surface 36 defines the main flow channel 40, which fluidly connects the inlet 32 to the outlet 34.

The moisture extraction component 20 also includes at least one of a hydrophobic surface 42 and a hydrophilic surface 44. In one example, the moisture extraction component 20 may have either the hydrophobic surface 42 or the hydrophilic surface 44. In another example, the moisture extraction component 20 may have both the hydrophobic surface 42 and the hydrophilic surface 44, as shown in FIG. 2. The hydrophobic surface 42 and the hydrophilic surface 44 may each be located on the inner surface 38 of the moisture extraction component 20.

The hydrophobic surface 42 is configured to repel moisture away from the hydrophobic surface 42. The hydrophobic surface 42 may be composed of a hydrophobic compound including but not limited to rare earth oxides and phosphates (e.g., LaPO4) that are naturally hydrophobic due to electron shielding of the unoccupied 4$f$ orbitals. Advantageously, the rare earth oxides and phosphates can withstand temperatures greater than 1000° C., which makes them suitable for the sintering required for a post process of binder-jet printing, as described below in method 400. Comparably, the base binder 112, discussed further below, may burn off during the post process of binder-jet printing (e.g., sintering process and/or infiltration). In an embodiment, the hydrophobic compound may be added to the binder as a sol. The hydrophilic surface 44 is configured to attract moisture to the hydrophilic surface 44. The hydrophilic surface 44 may be composed of silica flour, alumina, titanium dioxide, and/or any other inorganic oxide known to one of skill in the art. In an embodiment, the hydrophilic surface 44 is composed of an inorganic oxide. In another embodiment, the hydrophilic surface 44 is composed of at least one of silica flour, alumina, and titanium dioxide.

Since the hydrophobic surface 42 is configured to repel moisture away from the hydrophobic surface 42 and the hydrophilic surface 44 is configured to attract moisture away to the hydrophilic surface 44, the hydrophobic surface 42 and the hydrophilic surface 44 may be oriented to form a path 50 on the inner surface 38 of the moisture extraction component 20 in order to channel or direct the moisture flow 52. The path 50 on the inner surface 38 is configured to direct moisture flow, the path being defined by differences in hydrophobicity on the inner surface using at least one of a hydrophobic surface 42 and a hydrophilic surface 44. In an embodiment, the moisture flow 52 may be directed towards the exit port 54, as shown in FIG. 2. As shown in FIG. 2, the hydrophilic surface 44 is oriented in a path 50 on the inner surface 38 of the moisture extraction component 20 in order to channel or direct the flow of moisture and the hydrophobic surface 42 may be located on the remaining portion of the inner surface 38 where the hydrophilic surface 44 is not located. In another embodiment, the path 50 may be a bare inner surface 38 (i.e., without the hydrophilic surface 44) and the hydrophobic surface 42 may be located on the remaining portion of the inner surface 38 where the path 50 is not located.

Advantageously, the channeling of moisture flow 52 utilizing a hydrophobic surface 42 and a hydrophilic surface 44 helps enable moisture removal without inhibiting airflow 60 through the main flow channel 40.

Figure 3:
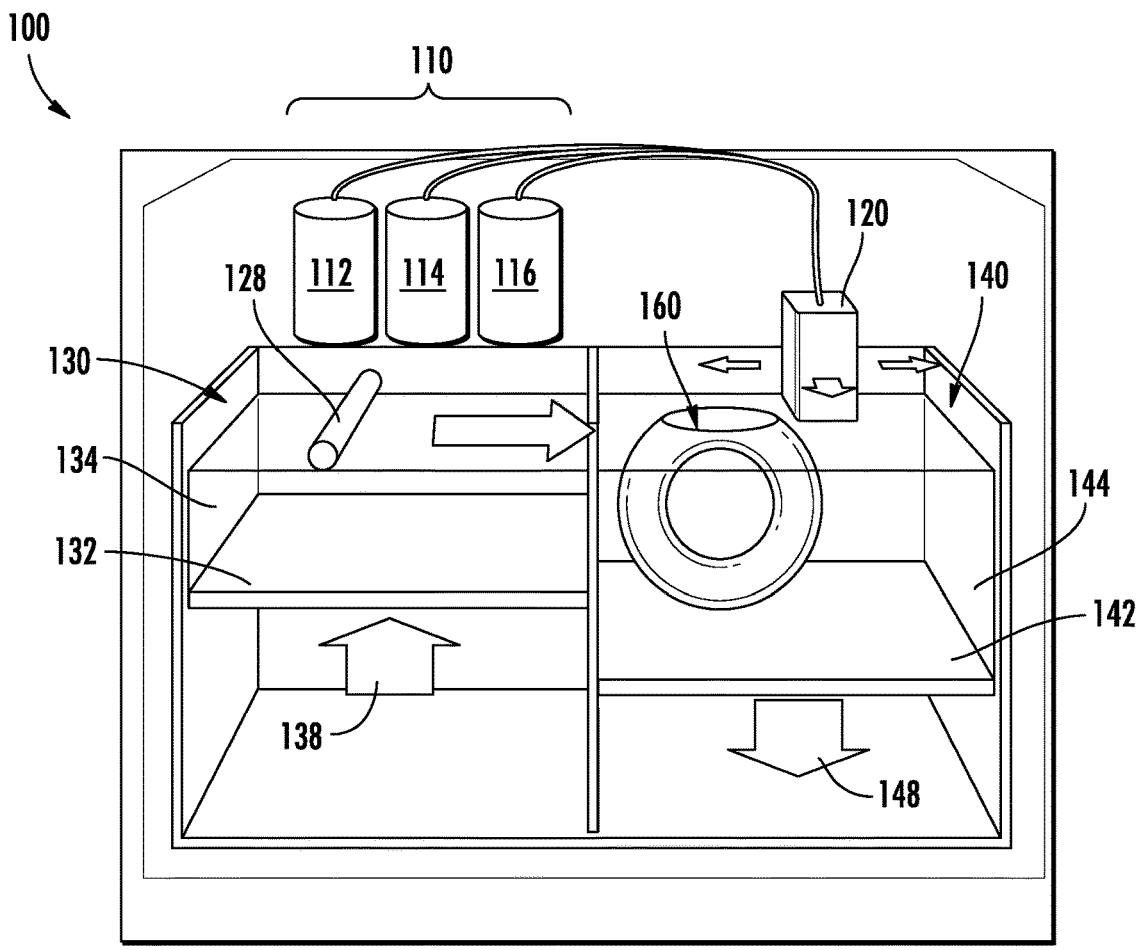
FIG. 3 shows a binder-jet printing apparatus 100 for printing the moisture extraction component of FIG. 2.

Referring now to FIG. 3, with continued reference to FIGS. 1-2. FIG. 3 shows a binder-jet printing apparatus 100 for printing the moisture extraction component 20 of FIG. 2. The binder-jet printing apparatus 100 helps apply the hydrophobic 42 and the hydrophilic material 44 to the inner surface 38 in areas where it may have been harder to get previously utilizing tradition methods such as, spray application.

The binder jet printing apparatus 100 may include two separate bins including a first bin 130 and a second bin 140. The first bin 130 contains a base material powder 134 that is combined with a binder 110 to form the body 30 of the moisture extraction component 20. A roller 128 rolls the base material power 134 from the first bin 130 to the second bin 140 and then a printer 120 applies a binder 110 to form a single layer of the moisture extraction component 20. Once a layer of the moisture extraction component 20 is formed, a platform 142 of the second bin 140 moves the excess base material powder 144 in the second bin 140 in the downward direction 148 along with the moisture extraction component 20 and a platform 132 of the first bin 130 moves the base material powder 134 in the first bin 130 in the upward direction 138. The process is repeated to form additional layers 160.

As the printer head 120 applies the binder 110 to the base material power 134 that was just laid down by the roller 128 in the second bin 140, the printer head 120 may selectively choose in real-time from one or more different binders 110 to form each layer 160 in order create different surfaces of the moisture extraction component 20. The different binders 110 may include base binder 112, a hydrophobic binder 114, and a hydrophilic binder 116. The base binder 112 may be utilized to compose the majority of the body 30 of the moisture extraction component 20. The hydrophobic binder 114 may be utilized to compose the hydrophobic surface 42 of the inner surface 38 of the moisture extraction component 20. The hydrophobic binder 114 may be a base binder 112 laden with hydrophobic particles. The hydrophilic binder 116 may be utilized to compose the hydrophilic surface 44 of the inner surface 38 of the moisture extraction component 20. The hydrophilic binder 116 may be a base binder 112 laden with hydrophilic particles.

Figure 4:
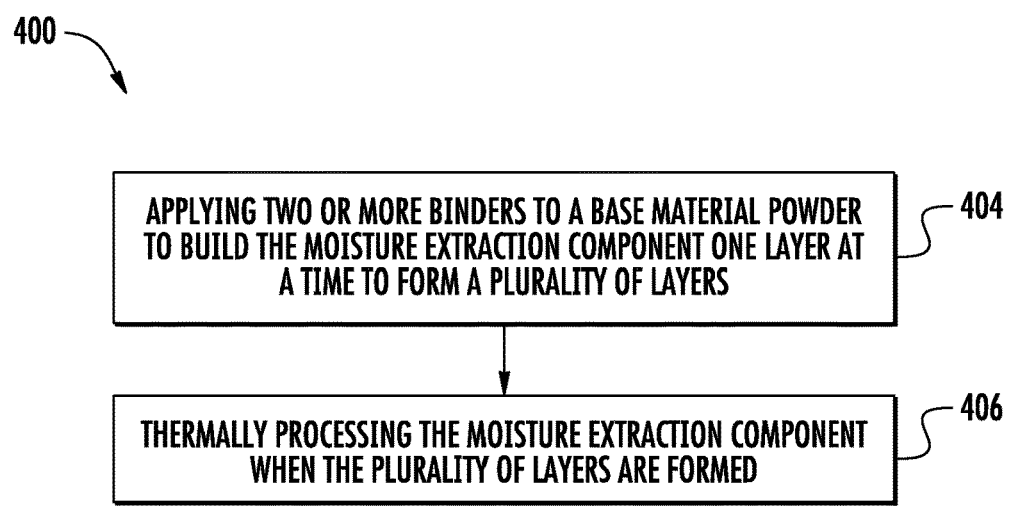
FIG. 4 is diagram of a method 400 of manufacturing the moisture extraction component of FIG. 2 using the binder-jet printing apparatus of FIG. 3, according to an embodiment of the present disclosure.

Referring now to FIG. 4, with continued reference to FIGS. 1-2. FIG. 3 shows a method 400 of manufacturing the moisture extraction component 20 of FIG. 2 using the binder-jet printing apparatus 100 of FIG. 3. At block 404, two or more binders 110 are applied to a base material powder 134 to build the moisture extraction component 20 one layer 160 at a time to form a plurality of layers 160. In an embodiment, the two or more binders 110 includes a base binder 110 and at least one of a hydrophobic binder 114 to form the hydrophobic surface 42 and a hydrophilic binder 116 to form the hydrophilic surface 44. The plurality of layer 160 are each laid down by the printer head 120, which is controlled by a computer processor and associated memory having a computer aid design model of the moisture extraction component 20. The printer head 120 is able to switch from one binder 110 to another binder 110 while laying each layer 160.

At block 406, the moisture extraction component 20 is thermally processed when the plurality of layers 160 are formed. The thermally processing includes at least one of sintering and infiltration. In an embodiment, at least one layer 160 of the plurality of layers 160 includes the base binder 112. In another embodiment, at least one layer 160 of the plurality of layers 160 includes the base binder 112 and the hydrophobic binder 114. In another embodiment, at least one layer 160 of the plurality of layers 160 includes the hydrophilic binder 116 and the hydrophobic binder 114. In another embodiment, at least one layer 160 of the plurality of layers includes the base binder 112, the hydrophilic binder 116, and the hydrophobic binder 114.

While the above description has described the flow process of FIG. 4 in a particular order, it should be appreciated that unless otherwise specifically required in the attached claims that the ordering of the steps may be varied.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A moisture extraction component, comprising:
   an inlet;
   an outlet opposite the inlet; and
   an inner surface defining a main flow channel, the main flow channel fluidly connecting the inlet to the outlet, wherein the inner surface is formed by a first material and a second material that define a path on the inner surface configured to direct moisture flow, the path being defined by a difference in hydrophobicity between the first material and the second material.

2. The moisture extraction component of claim 1, wherein the path is composed of the first material and the path is surrounded by the second material, and wherein the first material is hydrophilic.

3. The moisture extraction component of claim 2, wherein the path is composed of the first material and the path is surrounded by the second material, and wherein the second material is hydrophobic.

4. The moisture extraction component of claim 1, wherein the path is composed of the first material and the path is surrounded by the second material, and wherein the second material is hydrophobic.

5. The moisture extraction component of claim 1, further comprising:
an exit port fluidly connecting the inner surface and the outer surface, wherein the path is configured to direct moisture flow along the path to the exit port.

6. The moisture extraction component of claim 1, wherein the path is composed of the first material and the path is surrounded by the second material, and wherein the second material is hydrophobic and is composed of at least one of rare earth oxides and phosphates.

7. The moisture extraction component of claim 1, wherein the path is composed of the first material and the path is surrounded by the second material, and wherein the first material is hydrophilic and is composed of an inorganic oxide.

8. The moisture extraction component of claim 1, wherein the path is composed of the first material and the path is surrounded by the second material, and wherein the first material is hydrophilic and is composed of at least one of silica flour, alumina, and titanium dioxide.

9. An air conditioning system for an aircraft, the air conditioning system comprising:
a condenser;
an air cycle machine;
a moisture extraction component comprising:
an inlet;
an outlet opposite the inlet; and
an inner surface defining a main flow channel, the main flow channel fluidly connect the inlet to the outlet, wherein the inner surface is formed by a first material and a second material that define a path on the inner surface configured to direct moisture flow, the path being defined by a difference in hydrophobicity between the first material and the second material.

10. The air conditioning system of claim 9, wherein the path is composed of the first material and the path is surrounded by the second material, and wherein the first material is hydrophilic.

11. The air conditioning system of claim 10, wherein the path is composed of the first material and the path is surrounded by the second material, and wherein the second material is hydrophobic.

12. The air conditioning system of claim 9, wherein the path is composed of the first material and the path is surrounded by the second material, and wherein the second material is hydrophobic.

13. The air conditioning system of claim 9, further comprising:
an exit port fluidly connecting the inner surface and the outer surface, wherein the path is configured to direct moisture flow along the path to the exit port.

14. The air conditioning system of claim 9, wherein the path is composed of the first material and the path is surrounded by the second material, and wherein the second material is hydrophobic and is composed of at least one of rare earth oxides and phosphates.

15. A method of manufacturing a moisture extraction component, the method comprising:
applying two or more binders to a base material powder to build the moisture extraction component one layer at a time to form a plurality of layers, wherein the two or more binders includes a base binder and at least one of a hydrophobic binder and a hydrophilic binder; and
thermally processing the moisture extraction component after the plurality of layers are formed,
wherein the moisture extraction component comprises:
an inlet;
an outlet opposite the inlet; and
an inner surface defining a main flow channel, the main flow channel fluidly connecting the inlet to the outlet,
wherein the inner surface is formed by a first material and a second material that define a path on the inner surface configured to direct moisture flow, the path being defined by a difference in hydrophobicity between the first material and the second material.

16. The method of claim 15, wherein thermally processing includes at least one of sintering and infiltration.

17. The method of claim 15, wherein the path is composed of the first material and the path is surrounded by the second material, and wherein the first material includes a hydrophilic binder and the second material include the base binder.

18. The method of claim 15, wherein the path is composed of the first material and the path is surrounded by the second material, and wherein the first material includes the base binder and the second material include the hydrophobic binder.

19. The method of claim 15, wherein the path is composed of the first material and the path is surrounded by the second material, and wherein the first material includes the hydrophilic binder and the second material include the hydrophobic binder.

20. The method of claim 15, wherein at least one layer of the plurality of layers includes the base binder, the hydrophilic binder, and the hydrophobic binder.

* * * * *